US010848638B2

(12) United States Patent
Yamakado et al.

(10) Patent No.: US 10,848,638 B2
(45) Date of Patent: Nov. 24, 2020

(54) RELAYING CONTROL COMMANDS ACROSS NETWORK BOUNDARIES

(71) Applicant: SEIKO EPSON CORPORATION, Tokyo (JP)

(72) Inventors: Hitoshi Yamakado, Hino (JP); Tsuyoshi Kameda, Hino (JP); Yusuke Nakajima, Hino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/545,763

(22) Filed: Aug. 20, 2019

(65) Prior Publication Data

US 2020/0068088 A1 Feb. 27, 2020

(30) Foreign Application Priority Data

Aug. 23, 2018 (JP) .................................. 2018-155973

(51) Int. Cl.
*G06F 3/12* (2006.01)
*H04N 1/32* (2006.01)
*H04N 1/00* (2006.01)

(52) U.S. Cl.
CPC ..... *H04N 1/32416* (2013.01); *H04N 1/00875* (2013.01)

(58) Field of Classification Search
None
See application file for complete search history.

(56) References Cited

U.S. PATENT DOCUMENTS

| 7,779,108 | B2* | 8/2010 | Kawai | H04L 41/00 |
| | | | | 358/1.15 |
| 9,369,595 | B2* | 6/2016 | Kawabata | H04N 1/00408 |
| 9,563,389 | B2* | 2/2017 | Anezaki | G06F 3/1236 |
| 9,648,179 | B2* | 5/2017 | Ishino | H04N 1/00464 |
| 10,050,940 | B2* | 8/2018 | Maekawa | H04L 63/029 |
| 10,341,503 | B2* | 7/2019 | Toriyabe | H04N 1/00344 |
| 2018/0351746 | A1* | 12/2018 | Yoon | H04L 9/12 |

FOREIGN PATENT DOCUMENTS

JP 2017-211901 A 11/2017

* cited by examiner

*Primary Examiner* — Paul F Payer
(74) *Attorney, Agent, or Firm* — Workman Nydegger

(57) ABSTRACT

A processing system includes a storage unit that receives and stores information on electronic equipment from an equipment control unit, and a command relay unit that receives a control command from an information processing unit that performs processing which is based on the information stored in the storage unit. The command relay unit transmits the control command along a second communication path that is different from a first communication path that is a communication path between the information processing unit and the equipment control unit with the storage unit in between, and thus performs relay of the control command between the information processing unit and the equipment control unit.

11 Claims, 7 Drawing Sheets

RELAYING CONTROL COMMANDS ACROSS NETWORK BOUNDARIES

The present application is based on, and claims priority from JP Application Serial Number 2018-155973, filed Aug. 23, 2018, the disclosure of which is hereby incorporated by reference herein in its entirety

BACKGROUND

1. Technical Field

The present disclosure relates to a processing system, a control system, a relay apparatus, a communication method, and the like.

2. Related Art

In the related art, a management tool is known that collects information on electronic equipment such as a printer or performs control, such as setting, on the electronic equipment. For example, in JP-A-2017-211901, a management apparatus is disclosed that diverts setting information generated based on capability information on a first device to any other device that is of the same type as the first device and thus efficiently performs setting of operations by multiple devices.

In a technique in JP-A-2017-211901, the management apparatus that controls electronic equipment is connected to the same network as the electronic equipment that is a target for control. For this reason, the performing of control of the electronic equipment by the management apparatus does not particularly pose any problem.

A configuration is considered in which information collected from the electronic apparatus is accumulated in a storage unit that is connected through a network. The storage unit, for example, is a database server on the Internet. By accessing the storage unit from equipment such as a terminal apparatus and browsing collected pieces of information, it is possible that monitoring of the electronic equipment is remotely performed and so on. However, in the case of using this configuration, it is difficult to perform the control of the electronic equipment from the terminal apparatus. The reason is because there is a concern that the terminal apparatus will not be provided with a path for direct communication between the terminal apparatus and the electronic equipment or that a communication path with the storage unit in between will be blocked by a firewall.

SUMMARY

An aspect of the present disclosure relates to a processing system that is provided outside of a network in which an equipment control unit that controls electronic equipment which is a target for control is included, the processing system including: a storage unit that receives information on the electronic equipment from the equipment control unit and stores the received information on the electronic equipment; and a command relay unit that receives a control command for causing the equipment control unit to control the electronic equipment, from an information processing unit that performs processing which is based on the information that is stored in the storage unit, transmits the control command along a second communication path that is different from a first communication path which is a communication path between the information processing unit and the equipment control unit with the storage unit in between, and thus performs relay of the control command between the information processing unit and the equipment control unit.

DESCRIPTION OF EXEMPLARY EMBODIMENTS

The present embodiment will be described below. It is noted that the present embodiment which will be described below does not improperly limit the subject matter of the present disclosure disclosed in the appended claims. Furthermore, all configurations that will be described according to the present embodiment are not necessarily configurational requirements for the present disclosure.

1. Outline

Figure 1:
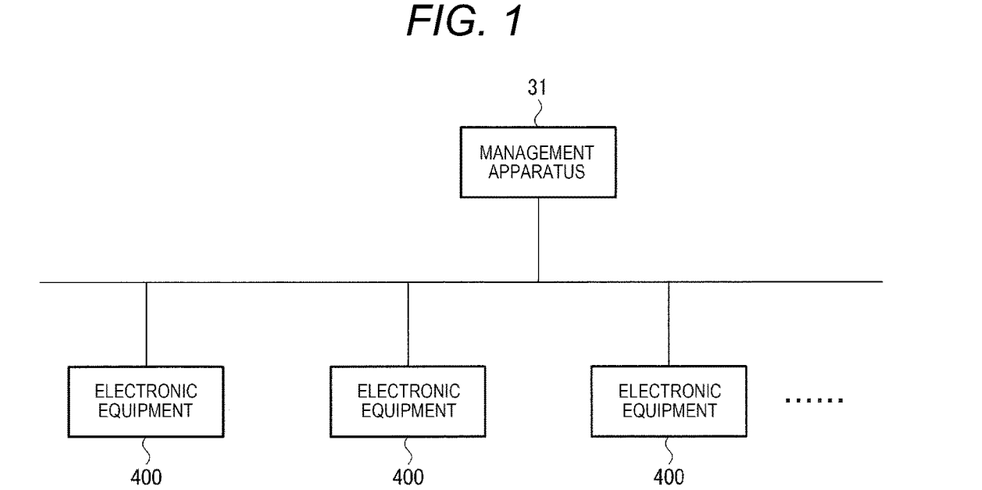
FIG. 1 is a diagram for describing a technique in the related art.

FIG. 1 is a diagram for describing a technique in the related art, which is disclosed in JP-A-2017-211901 and other patent literature. A system that is illustrated in FIG. 1 includes multiple pieces of electronic equipment 400 and a management apparatus 31 that controls a behavior or setting of the electronic equipment 400. It is noted that the electronic equipment 400 is the same as electronic equipment in a technique according to the present embodiment, and because of this, is described using the same reference numerals as in FIG. 3 and other figures that will be referred to below.

The electronic equipment 400, for example, is a printer. Alternatively, the electronic equipment 400 may be a scanner, a facsimile machine, or a copy machine. The electronic equipment 400 may be a multifunction peripheral (MFP) that has multiple functions, and a multifunction peripheral that has a printing function is also an example of the printer. The electronic equipment 400 may be a projector, a head-mounted display, wearable equipment, biological information measuring equipment, such as a pulse meter or a physical activity meter, a robot, video equipment, such as a camera, a portable information terminal, such as a smartphone, physical quantity measuring equipment, or the like.

The management apparatus 31 performs collecting of information, storing of the collected information, and utilizing of the stored information. For example, the management apparatus 31 performs polling and requires information on the electronic equipment 400 that is connected to the same network. Communication between the management apparatus 31 and each piece of electronic equipment 400, for example, is performed in compliance with a simple network management protocol (SNMP). In this case, the management apparatus 31 is a communication manager, and each piece of electronic equipment 400 is a communication agent.

Furthermore, with the communication in compliance with the SNMP, pieces of management information base (MIB) information are exchanged. Various settings of an interval for acquisition of information are possible, and for example, the information is acquired approximately one to several times every day.

The collected information is information indicating an operated state of the electronic equipment 400. In a case where the electronic equipment 400 is a printer, pieces of information, such as the number of printing sheets and an amount of ink consumption, are collected for a prescribed period of time. When an example is assumed in which the polling is performed one time every day, the prescribed period of time here is 24 hours.

Furthermore, the management apparatus 31 collects setting information on the electronic equipment 400. The setting information is information that is expressed as a combination of a setting item and a setting value. Examples of the setting item include a setting item relating to security, a setting time relating to a wireless LAN, a setting item relating to facsimile communication, a setting item relating to a supply source of a printing sheet, a setting time relating to authority to use a device, a setting item relating to a prescribed communication protocol for making a connection to a directory service on a network, and the like. The setting value is information indicating a setting state for each setting item.

Furthermore, the management apparatus 31 stores the collected information. For example, the management apparatus 31 stores pieces of information that are collected for a period of time that is longer than a polling interval. The period of time here, for example, is one month or several months, but a period that is longer than these periods of time may be set. Furthermore, the management apparatus 31 stores pieces of information that are collected by multiple pieces of electronic equipment 400.

Moreover, the management apparatus 31 performs processing and utilizing of the stored information. The utilization here, for example, is display processing of a screen on which the operated state of the electronic equipment 400 is to be presented to a user. For example, based on the information that is collected for a period of time comparatively longer than one month or so, the management apparatus 31 calculates an amount of statistics, such as an average value or a total value, and performs processing that displays the amount of statistics. When this is done, the amount of statistics can be presented to the user in a manner that is easy to understand an operation history of the electronic equipment 400. Alternatively, the management apparatus 31 may display operation histories of multiple pieces of electronic equipment 400 in a manner in that is capable of being compared. In this case, it is possible that the operation histories are presented to the user in a manner that is easy to understand a state of every equipment, or that the user is assisted in creating an operation plan for efficiently operating the multiple pieces of electronic equipment 400 and so on.

Furthermore, the management apparatus 31 may display the setting information on the electronic equipment 400. For example, the management apparatus 31 displays information that results from associating the setting item and the setting value with each other. At this point, it is possible that the management apparatus 31 performs control which changes setting of the electronic equipment 400, and in its narrow sense, control of the setting value. For example, it may be possible that a user operation of changing the setting value is applied to the management apparatus 31 through a display screen for the setting information. Then, the management apparatus 31 transmits a post-change setting value to the electronic equipment 400 and changes the setting of the electronic equipment 400. For example, by using the technique that is disclosed in JP-A-2017-211901, it is possible that setting change, targets for which is multiple pieces of electronic equipment 400, is efficiently performed.

In the above, the example is described in which all functions of the management apparatus 31 are realized such as the collecting, the storing, the utilizing of the information. The management apparatus 31 is connected to the same network as the electronic equipment 400, and because of this, easily performs bidirectional communication. For example, the management apparatus 31 and the electronic equipment 400 that are illustrated in FIG. 1 are connected to an inside-company intranet. It is noted that the management apparatus 31 and the electronic equipment 400 are not limited to those which are connected to each other through a network, and may be directly connected to each other using an interface such as a universal serial bus (USB).

Figure 2:
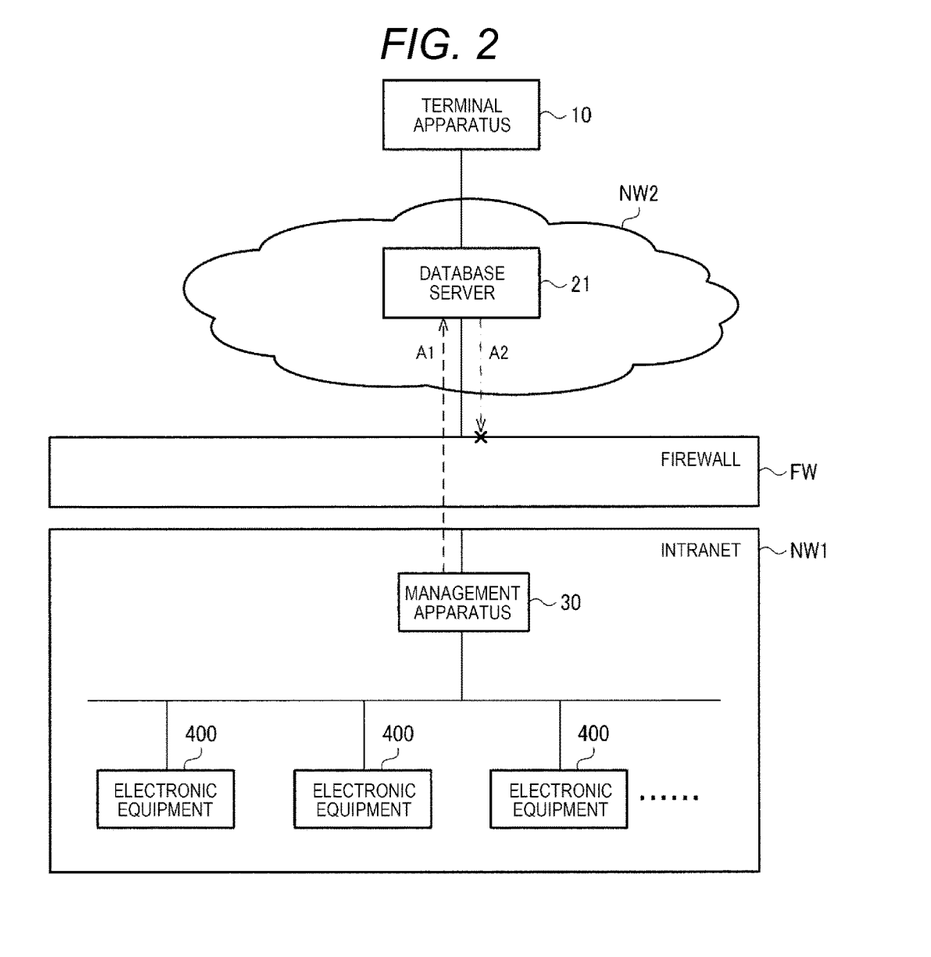
FIG. 2 is a diagram for describing a subject in the case of using a configuration that involves a network.

FIG. 2 illustrates an example of a configuration in a case where a function of the management apparatus 31 that is illustrated in FIG. 1 is realized using multiple apparatuses among which an external network, such as the Internet, is involved. In an example in FIG. 2, a management apparatus 30 collects operation information or the setting information from the electronic equipment 400 and transmits the collected operation information and setting information to a database server 21 through a network. That is, the management apparatus 30 performs operations up to and including the collecting and transmitting of the information, and the storing of the collected information is performed in the database server 21.

Furthermore, the utilization of the information is also performed in equipment that is different from the management apparatus 30. In the example in FIG. 2, the user who utilizes the information makes a connection to the database server 21 through a network using a terminal apparatus 10. For example, the terminal apparatus 10 may be a portable terminal apparatus such as a smartphone or a tablet terminal and may be any other apparatus such as a personal computer (PC). A connection between the terminal apparatus 10 and the database server 21 may be made using a dedicated application and may be made through a Web browser that runs on the terminal apparatus 10. In the case of using the Web browser, for example, the database server 21 may have a function of a Web application server, and the Web application server that possibly communicates with the database server 21 may be separately provided.

The terminal apparatus 10 displays the operation information or the setting information, which are acquired from the database server 21. When this is done, a state of the electronic equipment 400 can be remotely checked from outside of the network on which the electronic equipment 400 is installed. For example, it is possible that the user monitors the operated state of the electronic equipment 400 from a destination to which the user makes a visit. Alternatively, it is also possible that, in an enterprise that has multiple offices, the state of the electronic equipment 400 which is provided in each of the multiple offices is managed in a unified manner and so on.

However, there is a likelihood that a problem will occur in a configuration in FIG. 2, in a case where control of the electronic equipment 400 is performed from the terminal apparatus 10 that is present on a floor where the information is utilized. The control of the electronic equipment 400, for example, is the setting of the electronic equipment 400 described above.

In most cases, a firewall is installed in the enterprise in order to protect against leakage of confidential communication or personal information due to attack from the outside through a network. The firewall controls access to the inside-company intranet from an outside-company Internet. For example, for access to the outside-company Internet from the inside-company intranet, only a hypertext transfer protocol (HTTP) and a hypertext transfer protocol secure (HTTPS) are approved, and all access to the inside-company intranet from the outside-company Internet are blocked. Access that utilizes the HTTP is particularly access that uses a port number 80, and access that uses the HTTPS is access that uses a port number 443. More precisely, access to a server on the Internet from a PC on the intranet can be performed, but access to a PC or equipment on the intranet by the user on the Internet is blocked by the firewall.

In a case where the example in FIG. 2 is further considered, access A1 for transmitting the information collected by the management apparatus 30 to the database server 21 is approved, but access A2 to the management apparatus 30 from the database server 21 is blocked by a firewall FW. Because the database server 21 is one that is used for data retention, writing of data and reading of data to and from the database server 21 by a client apparatus are approved. However, without the assumption that control of the client apparatus is performed from the database server 21 side, although access to an internal network from the database server 21 is blocked, it is difficult for a problem to occur. For this reason, in many cases, considering the security, access to the internal network from the database server 21 is blocked by the firewall. As a result, it is difficult to perform the control of the electronic equipment 400 using a communication path that runs from the terminal apparatus 10 and passes through the database server 21. Furthermore, it is also difficult to perform control direct access to the terminal apparatus 10 from the management apparatus 30.

Figure 3:
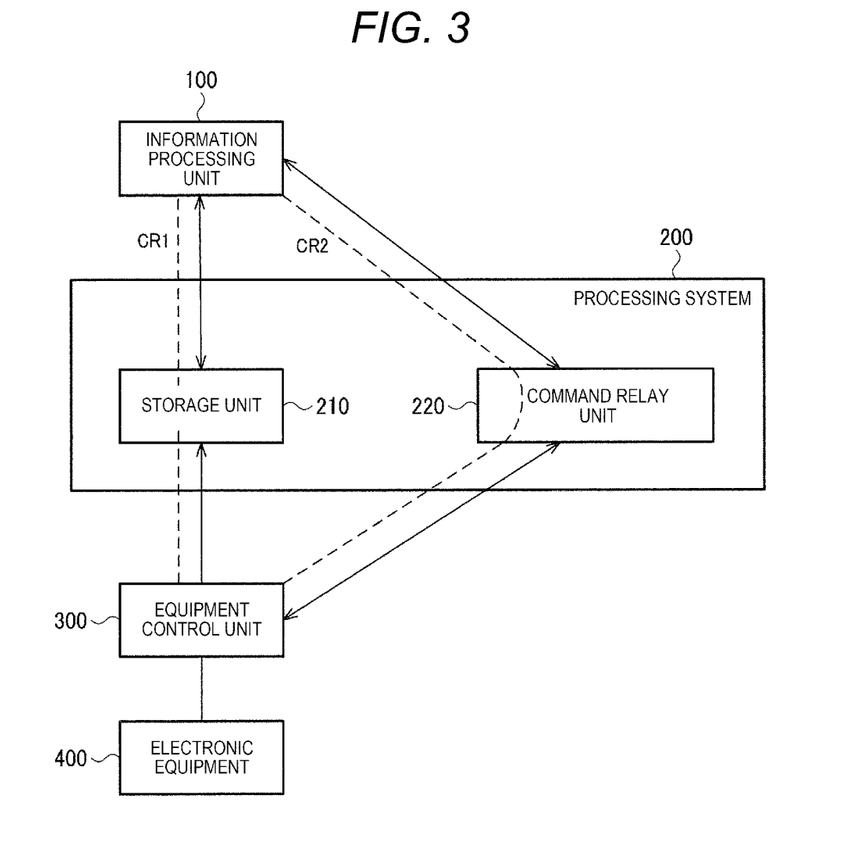
FIG. 3 is a diagram illustrating an example of a processing system.

FIG. 3 is a diagram describing a configuration of a processing system 200 according to the present embodiment. The processing system 200 is a processing system that is provided outside of a network in which the equipment control unit 300 that controls the electronic equipment 400 which is a target for control is included, and includes a storage unit 210 and a command relay unit 220. The storage unit 210 receives the information on the electronic equipment 400 from the equipment control unit 300 and stores the received information on the electronic equipment 400. The command relay unit 220 receives a control command for causing an equipment control unit 300 to perform the control of the electronic equipment 400, from an information processing unit 100 that performs processing which is based on the information that is stored in the storage unit 210. Then, the command relay unit 220 transmits the control command along a second communication path CR2 that is different from a first communication path CR1, and thus performs relay of the control command between the information processing unit 100 and the equipment control unit 300. The first communication path CR1 is a communication path between the information processing unit 100 and the equipment control unit 300 with the storage unit 210 in between. The second communication path CR2 is a communication path between the information processing unit 100 and the equipment control unit 300 with the command relay unit 220 in between. Furthermore, the network in which the electronic equipment 400 is included, for example, corresponds to an NW 1 in FIG. 2 that is the inside-company intranet. The processing system 200 is a system that is connected to equipment on the intranet through the Internet corresponding to an NW 2 in FIG. 2.

With the technique according to the present embodiment, the second communication path CR2, which is not provided in FIG. 2, is provided as a communication path from the information processing unit 100 to the equipment control unit 300. Unlike for the first communication path CR1 having a high probability of being communication-blocked, a communication scheme having a high probability of being available for bidirectional communication is set for the second communication path CR2, and thus the control command is suitably transmitted from the information processing unit 100 to the equipment control unit 300. In other words, it is possible that the electronic equipment 400 is suitably controlled from the information processing unit 100. It is noted that in its narrow sense, the relay according to the present embodiment is processing that transmits a control command that contains the same contents as the received control command. However, no limitation to this is imposed, and the command relay unit 220 may perform an operation of processing the received control command and may transmit a post-processing control command.

More specifically, access to the equipment control unit 300 from the information processing unit 100 along the first communication path CR1 is restricted in the firewall, and access to the equipment control unit 300 from the information processing unit 100 along the second communication path CR2 is not limited in the firewall. Depending on this, in a case where the storage unit 210 and the electronic equipment 400 are not connected to the same network, it is also possible that an influence of the firewall is suppressed and that the electronic equipment 400 is controlled from the information processing unit 100.

It is noted that FIG. 3 illustrates that the equipment control unit 300 and the electronic equipment 400 have different configurations. That is, in the same manner as in the example in FIG. 2, the management apparatus 30 that is connected to the same network as the electronic equipment 400 is provided and the management apparatus 30 includes the equipment control unit 300. A connection between the management apparatus 30 and the electronic equipment 400 is not limited to one with a network in between. An interface such as a USB may be used for such a connection. However, the equipment control unit 300 may be included in the electronic equipment 400. In other words, the electronic equipment 400 may be configured to include the management apparatus 30. In this case, each electronic equipment 400 collects its own operation information and setting information and the like and performs processing that transmits the collected information directly to the storage unit 210. With either configuration, it is also possible that the equipment control unit 300 performs the control of the electronic equipment 400. By the transmission of the control command to the equipment control unit 300, the control of the electronic equipment 400, which is in accordance with the control command, is performed.

Figure 4:
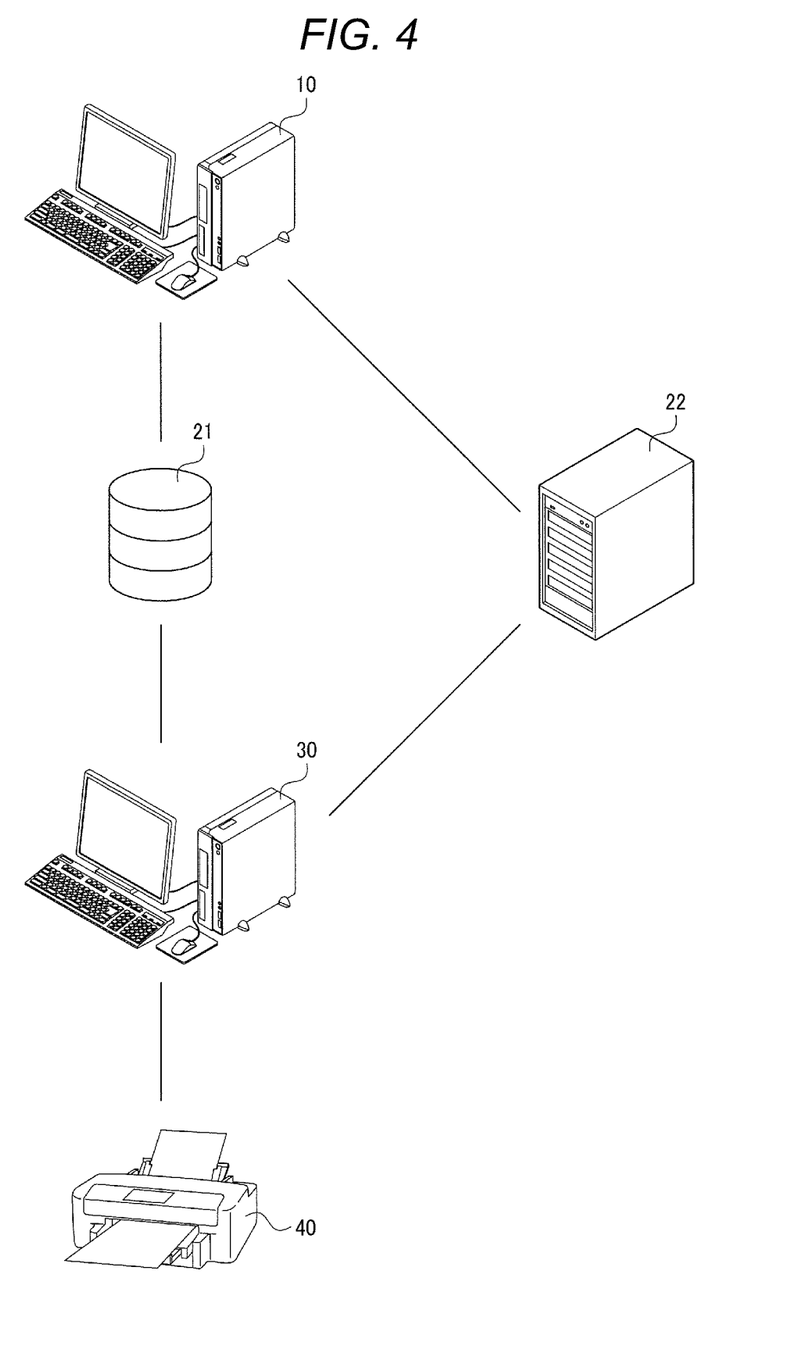
FIG. 4 is a diagram illustrating a specific example of equipment.

FIG. 4 illustrates a specific example of a configuration of equipment that realizes a system which includes the processing system 200. The information processing unit 100, for example, is included in the terminal apparatus 10. The terminal apparatus 10 is a portable terminal apparatus, a PC, or the like. The storage unit 210, for example, is the database server 21, and the command relay unit 220, for example, is a command server 22. The equipment control unit 300, for example, is the management apparatus 30 such as a PC, and the electronic equipment 400, for example, is a printer 40. It is noted that, as described above, the management apparatus 30 may be omitted, and that the electronic equipment 400 may include the equipment control unit 300.

The database server 21 and the command server 22 are connected to the terminal apparatus 10 through a network such as the Internet. Furthermore, the database server 21 and the command server 22 are connected to the management apparatus 30 through the network such as the Internet. The management apparatus 30 and the printer 40 are provided on the same network such as an intranet. However, FIG. 4 illustrates an example of the equipment. Each unit according to the present embodiment may be realized by equipment that is different from an example which is illustrated in FIG. 4.

2. Flow for Processing

The command relay unit 220 needs to be accessible from both the information processing unit 100 and the equipment control unit 300. Furthermore, the transmission of the control command from the command relay unit 220 to the equipment control unit 300 may be of a pull type that receives a polling frame from the equipment control unit 300. However, it is desirable that the command relay unit 220 has a function of providing a push notification to the equipment control unit 300. When this is done, it is possible that the control command is actively transmitted from the command relay unit 220 side.

Furthermore, although this is not a required configuration, it is desirable that the command relay unit 220 has a function of imposing access limitation on a per-user basis or a per-group basis and a function of suppressing falsification of the control command. When this is done, the control of the electronic equipment 400 by a user who is not endowed with authority or a user who has malicious intent can be suppressed. Furthermore, it is desirable that the command relay unit 220 can store the control command, but it is also possible that the storage unit 210 stores the control command.

As described above, when considering a requirement that has to be satisfied by the command relay unit 220, for example, it is desirable that communication in accordance with a communication protocol for message queuing telemetry transport (MQTT) is performed along the second communication path CR2. In other words, it is desirable that the command server 22 which includes the command relay unit 220 is equipment that performs communication in compliance with the MQTT.

For example, the command server 22 is a broker that is equivalent to a server in the MQTT. The broker here is also expressed as a message broker. Then, the information processing unit 100 and the equipment control unit 300 are clients that perform the communication in compliance with the MQTT. More specifically, the terminal apparatus 10 and the management apparatus 30 are pieces of equipment that, as an MQTT client, performs an operation.

A broker that complies with the MQTT receives a message from a client and transmits the received message to the corresponding client that is a destination. The client registers data on which message to be desired, in advance with the broker. More specifically, an MQTT message is configured with a topic and data. A reception client registers the topic of the desired message with the broker. A transmission client designates the topic and transmits data to the broker, and, when the topic registered by the client and the topic of the message are the same, transmits the message to the client.

It is possible that, in the MQTT, each client also operates as any one of the transmission client and the reception client. That is, it is possible that any one of the transmission of the message to the equipment control unit 300 by the information processing unit 100 that is the transmission client, and the transmission of the message to the information processing unit 100 by the equipment control unit 300 that is the transmission client is realized.

Figure 5:
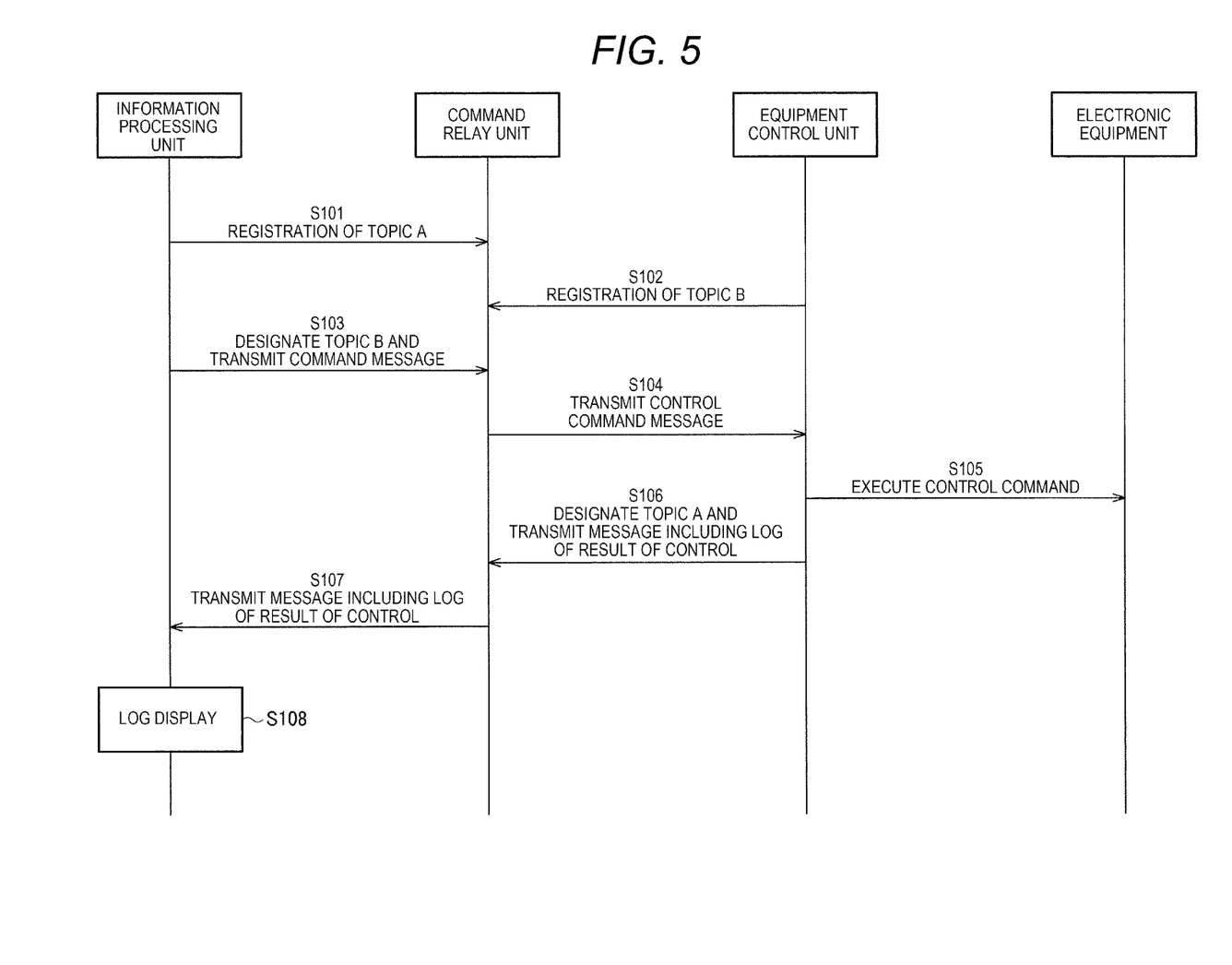
FIG. 5 is a diagram for describing a processing sequence according to the present embodiment.

FIG. 5 is a diagram for describing a processing sequence for transmitting the control command from the information processing unit 100 to the equipment control unit 300 along a communication path that uses the MQTT. First, prior registration processing is performed. Specifically, the information processing unit 100 registers the topic that is transmitted by the equipment control unit 300, with the message broker (S101). The topic that is transmitted by the equipment control unit 300 will be expressed below as a topic A. With the registration in S101, the information processing unit 100 can receive the message from the equipment control unit 300. In the same manner, the equipment control unit 300 registers the topic that is transmitted by the information processing unit 100, with the message broker (S102). The topic that is transmitted by the information processing unit 100 will be expressed below as a topic B. With the registration in S102, the equipment control unit 300 can receive the message from the information processing unit 100. It is noted that one of the processing in S101 and the processing in S102 may be performed earlier than the other. Furthermore, the registration processing may be earlier than the processing in S103 onwards, and it does not matter whether or not a processing timing is specific.

Subsequent to the registration processing, the transmission of the control command is performed. The information processing unit 100 designates the topic B and transmits the message that includes the control command, to the command relay unit 220 that is the broker (S103). Included in the control command are information that specifies the electronic equipment 400 which is at least the target for control and the information that specifies details of control. The control command, for example, is a command for setting the electronic equipment 400. In this case, the information that specifies the details of the control is information that includes the setting item and the setting value. It is noted that, because the broker that complies with the MQTT does not have a function of storing the message, each time the broker receives the message, the message may be stored in the storage unit 210 that is the database server 21.

According to details of the topic, the command relay unit 220 that is the broker transmits the message to the client. At this point, because the information processing unit 100 sets the topic B, the command relay unit 220 transmits the message to the equipment control unit 300 according to the registration in S102 (S104).

When receiving the control command, the equipment control unit 300 performs the control of the electronic equipment 400, which is in accordance with details of the control command (S105). The transmission of the control command from the information processing unit 100 to the equipment control unit 300 and the control of the electronic equipment 400, which is based on the control command are possible with the processing described above. For example, in a case where the control command is the command for setting the electronic equipment 400, it is possible that the setting of the electronic equipment 400 is performed from the information processing unit 100.

Because the second communication path CR2 is the communication path that uses the MQTT, in a case where transmission of a control command message is performed by the information processing unit 100, with management of the command relay unit 220, the message is transmitted to the equipment control unit 300. That is, the use of the MQTT can realize the control of the electronic equipment 400, a source of which is the information processing unit 100. It is noted that, when considering the firewall FW that is illustrated in FIG. 2, it is desirable that the equipment control unit 300 performs processing which opens a port that is used in the MQTT or utilizes MQTT over Web Socket that will be described below.

Furthermore, the command relay unit 220 may receive log information indicating a result of the control from the equipment control unit 300 and perform processing that transmits the log information to the information processing unit 100. With the display of the log information in the information processing unit 100, it is possible that the result of the control is notified to the user who transmits the control command.

For example, as illustrated in FIG. 5, the equipment control unit 300 designates the topic A and transmits a message that includes a log of the result of the control, to the command relay unit 220 that is the broker (S106). The command relay unit 220 transmits the message to the client according to the details of the topic. At this point, because the equipment control unit 300 sets the topic A, the command relay unit 220 transmits the message to the information processing unit 100 according to the registration in S101 (S107). The information processing unit 100 displays the log of the result of the control on a display unit for presentation to the user (S108).

It is noted that the second communication path CR2 is described above as being the communication path along which the communication in accordance with the MQTT is performed. However, the second communication path CR2 may be a communication path along which bidirectional communication between the information processing unit 100 and the equipment control unit 300 is possible, and a communication scheme that is used is not limited to the MQTT. For example, the second communication path CR2 may be a communication path along which communication in accordance with a Web Socket is performed.

The Web Socket is a communication standard for realizing the bidirectional communication in a web application. In the Web Socket, after the server and the client make connections one time, information transmission and reception are performed while the connection is established. For this reason, push communication from the server side to the client is possible without establishing a new connection.

The command relay unit 220 according to the present embodiment is a Web server that supports standards for the Web Socket, and the information processing unit 100 and the equipment control unit 300 are Web clients that support the standards for the Web Socket. Many of the Web browsers that are widely used support the Web Socket, and it is possible that the information processing unit 100 and the equipment control unit 300 operate as the Web clients that support the standards for the Web Socket without adding dedicated software.

Furthermore, for communication in accordance with the Web Socket, a port number 80 that corresponds to the HTTP, and a port number 443 that corresponds to the HTTPS are used. These ports are used for communication with a general Web server and, because of this, are ports the use of which is approved in many of the firewalls. That is, the second communication path CR2 is set to be the communication path along which the communication in accordance with the Web Socket is performed, and thus it is possible that communication blocking due to the firewall is suppressed.

Furthermore, MQTT over Web Socket is known that is a standard for mutual communication in accordance with the MQTT and the Web Socket. With MQTT over Web Socket, an MQTT message is transmitted through a Web Socket protocol. For example, in FIG. 5, an example is illustrated in which only MQTT protocol is used, but a modification implementation is possible in which a protocol for MQTT over Web Socket is used in a technique in FIG. 5. In this case, because a port number 80 or a port number 443 are used, although a port for the MQTT is not opened, it is possible that the communication blocking due to the firewall is suppressed.

3. Modification Example

Several modification examples will be described below.

3.1 Checking of a State of the Electronic Equipment

In the technique in the related art, which is disclosed JP-A-2017-211901 and other patent literature, when transmitting the control command, a state of electronic equipment 400 that is the target for control is not sufficiently considered. For this reason, there is a concern that the performing of the control will block the electronic equipment 400 from operating, depending on the state of the electronic equipment 400. For example, in a case where the electronic equipment 400 that is the printer 40 transmits the setting command while performing printing, the printing is interrupted.

Thus, the command relay unit 220 according to the present embodiment performs processing that accumulates the control command received from the information processing unit 100. In a case where it is determined that the electronic equipment 400 that is a target for the control command is in a state of being able to execute the control command, the command relay unit 220 performs processing that transmits the control command to the equipment control unit 300.

Figure 6:
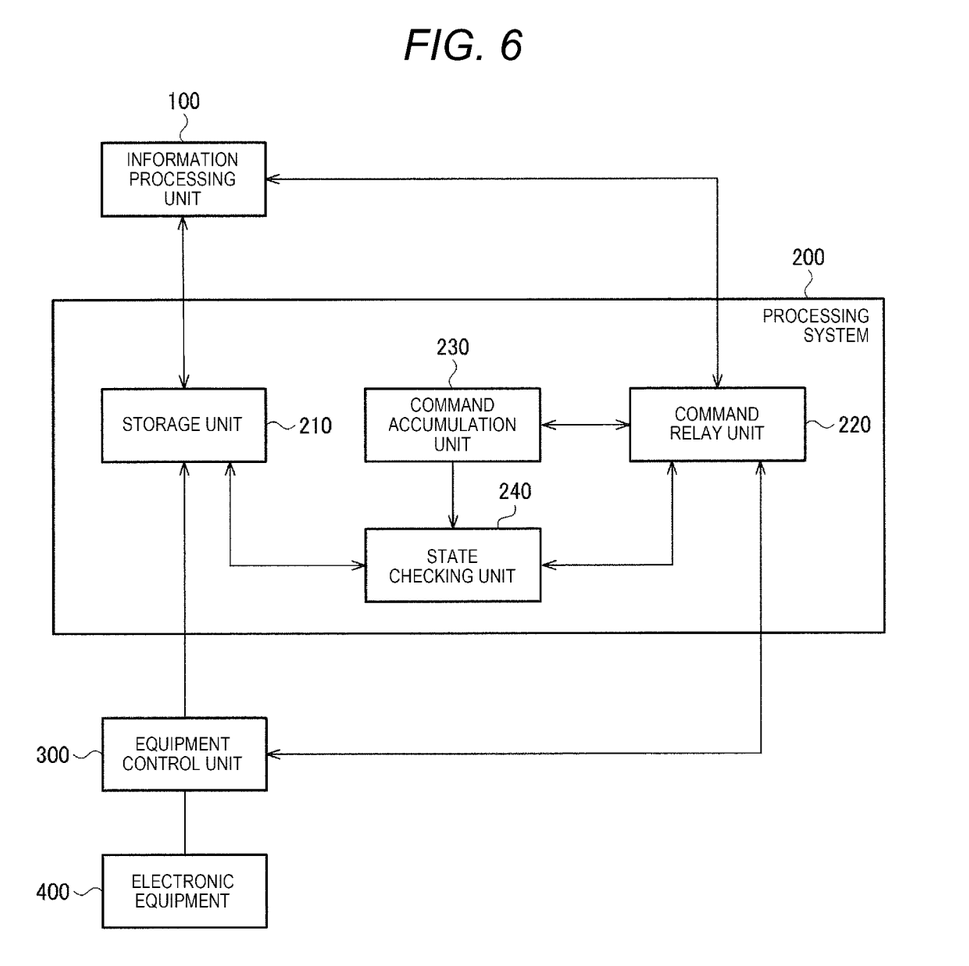
FIG. 6 is a diagram illustrating another example of the configuration of the processing system.

FIG. 6 is a diagram for describing another example of the configuration of the system that includes the processing system 200. In addition to the storage unit 210 and the command relay unit 220, the processing system 200 includes a command accumulation unit 230 and a state checking unit 240. It is noted that the command accumulation unit 230 and the state checking unit 240 may be included in the database server 21 in FIG. 4, may be included in the command server 22, and may be included in another piece of equipment that is not illustrated in FIG. 4. Furthermore, the command accumulation unit 230 and the state checking unit 240 may be provided in the same equipment and may be provided in different pieces of equipment, respectively.

The command accumulation unit 230 performs accumulation of the control command. The command accumulation unit 230, for example, performs the accumulation of the control command using a queue. In a case where the control command is received from the information processing unit 100, the command relay unit 220 not only performs notification to the command accumulation unit 230, but also accumulates the control command to the command accumulation unit 230. Furthermore, in a case where the command accumulation unit 230 accumulates the control command, the command relay unit 220 causes the state checking unit 240 to check the state of the electronic equipment 400.

The checking of the state of the electronic equipment 400 can be realized by various techniques. For example, the equipment control unit 300 collects information on the state of the electronic equipment 400. States here include various states, for example, such as "idle state", "printing in progress", and "erroneous state". The idle state is a state where the printing is possibly performed and where a printing job is not assigned. The erroneous state is a state where an error occurs and where the printing job cannot be performed. The state checking unit 240 acquires the information on the state of the electronic equipment 400 and determines whether or not a state that is specified by the information on the state is a state where the command is executable. For example, the idle state is a state where the command is executable, and the printing in progress and the erroneous state are determined as states where the command is unexecutable. It is assumed that, using the communication through the command relay unit 220, the state checking unit 240 acquires the information on the state, but the information on the state is not blocked from being acquired using the communication through the storage unit 210.

Then, in a case where it is determined by the state checking unit 240 that the electronic equipment 400 is in a state of being able to execute the command, the command relay unit 220 transmits the control command to the equipment control unit 300. Furthermore, in a case where it is determined by the state checking unit 240 that the electronic equipment 400 is in a state of being unable to execute the command, the command relay unit 220 waits a prescribed time without transmitting the control command to the equipment control unit 300 and, after the prescribed time elapsed, causes the state checking unit 240 to check the state of the electronic equipment 400.

When this is done, it is possible to suppress the electronic equipment 400 from being blocked from operating due to the transmission of the control command.

With a technique that uses the MQTT which is illustrated in FIG. 5, for example, the command accumulation unit 230 and the state checking unit 240 operate as the MQTT clients. Then, each client may register the topic with the broker in such a manner that the message is transmitted to (1) the information processing unit 100, (2) the command accumulation unit 230, (3) the state checking unit 240, and (4) the equipment control unit 300 in this order.

For example, the information processing unit 100 registers the topic A, the equipment control unit 300 registers the topic B, the command accumulation unit 230 registers a topic C, and the state checking unit 240 registers with a topic D.

First, the information processing unit 100 designates the topic C, and transmits the message that includes the control message. The command relay unit 220 transmits the message to the command accumulation unit 230 according to the topic. The command accumulation unit 230 accumulates the control command that is included in the received message.

When the control command is accumulated, the command accumulation unit 230 transmits the message with the topic D being designated. The message here is a message for providing an instruction to check the state of the electronic equipment 400 that is the target for control. The message includes information that specifies the electronic equipment 400 that is a target of state checking. The command relay unit 220 transmits the message to the state checking unit 240 according to the topic. When this is done, the accumulation of the control command is triggered, and thus processing that checks the state of the electronic equipment 400 is started.

The state checking unit 240 performs processing that checks the state of the electronic equipment 400 that is the target, based on reception of the message. For example, the state checking unit 240 transmits the message with the topic B being designated. The message here is a message for providing an instruction to transmit the information on the state of the electronic equipment 400 that is the target for control, and includes the information that specifies the electronic equipment 400 that is the target for state checking. The command relay unit 220 transmits the message to the equipment control unit 300 according to the topic. Based on the reception of the message, the equipment control unit 300 acquires and transmits the information on the state of the electronic equipment 400 that is the target. By transmitting the message that includes the information on the state with the topic D being designated, the equipment control unit 300 may transmit the information on the state to the state checking unit 240. Alternatively, the equipment control unit 300 performs processing that writes the information on the state to the storage unit 210, and, referring to a prescribed area of the storage unit 210, the state checking unit 240 may acquire the information on the state.

In a case where it is determined that the electronic equipment 400 is in a state of being able to execute the command, the state checking unit 240 reads the control command from the command accumulation unit 230 and transmits the message that includes the control command, with the topic B being designated. The command relay unit 220 transmits the message to the equipment control unit 300.

As described above, in a case where a prescribed condition is satisfied, the command relay unit 220 provides a notification to that effect. In the example described above, the command relay unit 220 performs notification to the command accumulation unit 230 in a case where the control command is received, notification to the state checking unit 240 in a case where the control command is accumulated in a queue, notification to the equipment control unit 300 in a case where it is determined that the electronic equipment 400 is in the state of being able to execute the command, and so on. It is noted that the notification here also includes processing that transmits the control command to the equipment control unit 300.

Specifically, the command relay unit 220 performs notification processing that notifies that the control command is received. A target for notification may be the equipment control unit 300 as in an example in FIG. 5 and be the command accumulation unit 230 as described above as the modification example. In any case, the command relay unit 220 can perform various processing operations, which are triggered by the transmission of the control command by the information processing unit 100. Accordingly, it is possible that the control of the electronic equipment 400, the source of which is the information processing unit 100, is suitably performed.

3.2 Modification Example Relating to the Command Server

Furthermore, the example where the second communication path CR2 is the communication path along which the communication in accordance with the MQTT or the Web Socket is performed is described above. Specifically, the example where the command server 22 that includes the command relay unit 220 is the message broker that complies with the MQTT, or the Web server that supports the Web Socket is described. However, the command relay unit 220 according to the present embodiment may be able to perform bidirectional communication between the information processing unit 100 and the equipment control unit 300 or suitable notification processing, and is not limited to the example described above.

For example, the second communication path CR2 is a communication path for a chat server. In other words, the command server 22 that includes the command relay unit 220 may be the chat server. In this case, the notification processing by the command relay unit 220 may be realized by a notification function of the chat server. Alternatively, a Web Application Programming Interface (Web API) that is designated in advance when a specific keyword is input is called utilizing a Web Hook function of the chat server, and thus the notification processing may be realized.

Figure 7:
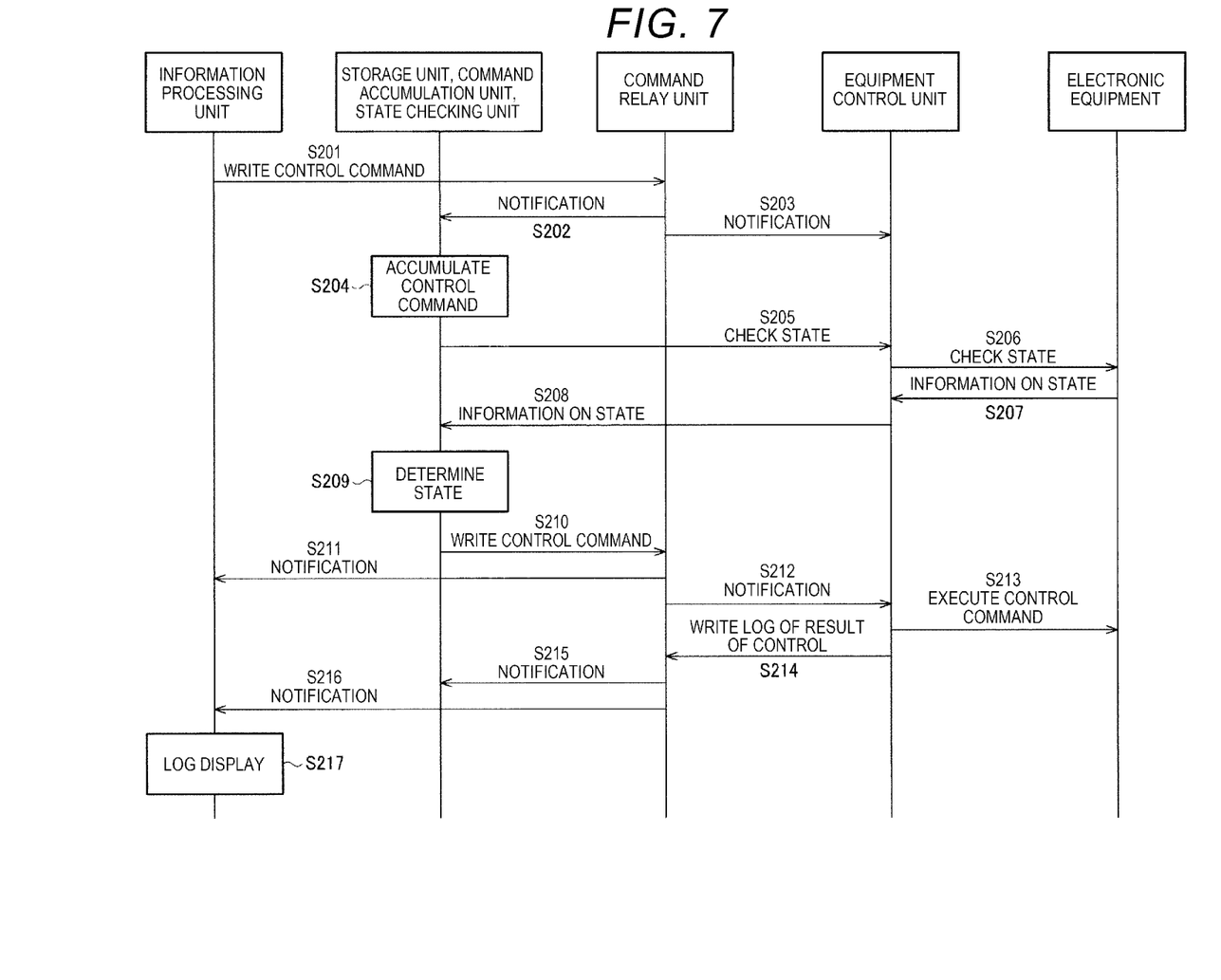
FIG. 7 is another diagram for describing the processing sequence according to the present embodiment.

FIG. 7 is a diagram for describing a processing sequence in the case of using the chat server. First, the information processing unit 100, the storage unit 210, and the equipment control unit 300, as participants in a chat, performs registration with the chat server. It is noted that, at this point, the example where the database server 21 includes the storage unit 210, the command accumulation unit 230, and the state checking unit 240 is described, but that various modification implementations are possible as described above.

The information processing unit 100 writes the control command to the command relay unit 220 that is the chat server (S201). Utilizing a function of the chat server, the command relay unit 220 notifies the participant that the writing of the control command was performed. Specifically, the command relay unit 220 performs notification to the database server 21 that includes the storage unit 210 or the like, and the equipment control unit 300 (S202 and S203).

In a case where, based on the notification in S202, the information processing unit 100 is recognized as writing the control command, the command accumulation unit 230 of the database server 21 accumulates the control command in the queue (S204). Because it is assumed here that the checking of the state of the electronic equipment 400 is performed, the equipment control unit 300, although notified in S203, does not respond to the writing of the control command by the information processing unit 100.

Next, the state checking unit 240 of the database server 21 checks whether or not the electronic equipment 400 that is the target to which the control is to be transmitted is in the state of being able to execute the command. Specifically, the state checking unit 240 makes a request to the equipment control unit 300 for the information on the state (S205), the equipment control unit 300 makes a request to the electronic equipment 400 for the information on the state (S206), the electronic equipment 400 performs transmission of the information on the state to the equipment control unit 300 (S207), and the equipment control unit 300 performs transmission of the information on the state to the state checking unit 240 (S208). The processing in S205 and the processing in S208 may be performed through the command relay unit 220 and may be performed directly between the database server 21 and the equipment control unit 300.

The state checking unit 240 makes a determination based on the information on the state (S209), and, in a case where the electronic equipment 400 that is the target for control is able to execute the command, writes the control command accumulated in the command accumulation unit 230 to the chat server (S210). Although not illustrated in FIG. 7, in a case where the electronic equipment 400 that is the target for control is unable to execute the command, the state checking unit 240 waits a prescribed time, and, after the prescribed time elapsed, again performs the checking of the state.

Utilizing the function of the chat server, the command relay unit 220 notifies the participant that the writing of the control command was performed. Specifically, the command relay unit 220 performs notification to the information processing unit 100 and the equipment control unit 300 (S211 and S212).

In a case where, based on the notification in S212, the database server 21 is recognized as writing the control command, the equipment control unit 300 transmits the control command to the electronic equipment 400, and performs the control of the electronic equipment 400 (S213). On the other hand, the information processing unit 100, although notified in S211, does not respond to the writing of the control command by the database server 21.

It is noted that the example where the control command itself is described above as being written in S210, but no limitation to this is imposed. For example, the state checking unit 240 may write reference information on the control command that is written in S201, in S210. The reference information here may be information that specifies the writing, which includes the control command, and may be information that specifies the control command that itself is subject to the writing. In this case, the equipment control unit 300 specifies the control command based on the reference information that is written in S210, and performs processing that executes the specified control command. In FIG. 7, the example where the writing to the chat server is performed in a format that allows reference by all participants is assumed, and it is also possible that the equipment control unit 300 refers to the writing of the control command in S201. Because of this, such a modification implementation is possible.

Furthermore, in the same manner as in the example in FIG. 5, the command relay unit 220 may transmit a log of a result of executing the control command to the information processing unit 100. Specifically, the equipment control unit 300 writes the log of the result of the control to the chat server (S214). Utilizing the function of the chat server, the command relay unit 220 notifies the participant that the writing of the log of the result of the control was performed. Specifically, the command relay unit 220 makes a notification to the information processing unit 100 and the database server 21 (S215 and S216).

In a case where, based on the notification in S216, the equipment control unit 300 is recognized as writing the log of the result of the control, the information processing unit 100 performs processing that displays the log of the result of the control on the display unit (S217). On the other hand, the database server 21, although notified in S215, does not respond to the writing of the log of the result of the control by the equipment control unit 300.

It is noted that in FIG. 7, the example where the writing to the chat server is performed in the format that enables reference by all participants is described, but that writing in a format of a destination-designated direct message may be performed. Furthermore, the example where in the embodiment that uses the MQTT, the Web Socket, or the like that is described with reference to FIG. 5, the destination-designated message is transmitted is described, but as is the case with the chat server, the message may be transmitted in the format that enables the reference by all participants.

Furthermore, the second communication path CR2 may be a communication path for a mail server. In other words, the command server 22 that includes the command relay unit 220 may be the mail server. In this case, the notification processing by the command relay unit 220 may be realized by a push function of the mail server.

Furthermore, in a case where the mail server is used as the command server 22, the message, such as the control command, may be transmitted to a specific partner by designating a destination address, and addresses of all participants may be designated. That is, in a case where the mail server is used, in the same manner as in the MQTT, the Web Socket, and the chat servers as examples, various modification implementations of the target for notification are possible.

It is noted that in FIG. 4, the example where the storage unit 210 is realized by the database server 21 and where the command relay unit 220 is realized by the command server 22 is described. On this occasion, the database server 21 is not limited to one that is realized by one server apparatus, and may be a server system that includes multiple server apparatuses. In the same manner, the command server 22 may also be a single server apparatus and may be a serve system that includes multiple server apparatuses.

Furthermore, the database server 21 and the command server 22 may be a virtual server that results from virtualizing a server. In this case, virtual servers may operate on the same physical server and may be operate on different physical servers, respectively. Furthermore, by monitoring a communication load or the like, dynamic scaling may be performed on each server. For example, the number of virtual servers may be dynamically changed.

That is, various modification implementations of the server that makes up the processing system 200 according to the present embodiment are possible in terms of the number of physical servers, the number of virtual servers in a case where the servers are virtualized, or a correspondence relationship between the virtual server and the physical server.

3.3 Modification Example Relating to the Control Command

Furthermore, the example where the control command is the setting command that performs the setting of the electronic equipment 400 is described above. However, the control command is not limited to this.

For example, the control command may be an information collection command that collects the information on the electronic equipment 400. In its narrow sense, the information collection command is a command that instructs the equipment control unit 300 to collect information at a different timing from a normal information collection timing. Alternatively, the information collection command is a command that instructs the equipment control unit 300 to collect information that is not a target for collection at the normal information collection timing. When this is done, in a case where specific information relating to the electronic equipment 400 becomes necessary, it is possible that the information processing unit 100 collects information without waiting a periodic information collection timing, such as collecting information one time every day. For example, it is possible that information that is desired by the user is displayed in real time, and so on.

It is noted that, in the same manner as the log of the result of the control, which is described above, information that is collected according to the information collection command may be transmitted to the information processing unit 100 along the communication path through the command relay unit 220. However, because it is not assumed that the firewall exerts an influence on the communication between the information processing unit 100 and the storage unit 210, it is easy for the information processing unit 100 to browse pieces of information stored in the storage unit 210.

Consequently, the storage unit 210 may store the information that is collected by the equipment control unit 300 based on the information collection command, and may transmit the stored information to the information processing unit 100. That is, the storage unit 210 may perform relay of the information between the equipment control unit 300 and the information processing unit 100 along the first communication path CR1.

When this is done, it is possible that communication of the information collection command and communication of the information that is based on the command are realized using different communication paths, respectively. Particularly, it is considered that, in many cases, information that is collected with the information collection command overlaps information that is periodically collected. For this reason, by storing the information in the storage unit 210 using the first communication path CR1, it is possible that the storing of the information in the processing system. 200 is efficiently realized. For example, in a case where second information that is information which is of the same type as the first information that is periodically collected is collected according to the information collection command, by overwriting the first information in the storage area with the second information, it is possible that a storage area is effectively utilized.

3.4 System and Relay Apparatus

Furthermore, a target to which the technique according to the present embodiment is applied is not limited to the processing system 200 described above.

For example, the technique according to the present embodiment can be applied to a system that includes the processing system 200 described above and the electronic equipment 400. Alternatively, a system according to the present embodiment may be a system that includes the processing system 200 and the information processing unit 100 and may be a system that includes the processing system 200 and the equipment control unit 300. Furthermore, the system according to the present embodiment may include two or more of the information processing unit 100, the equipment control unit 300, and the electronic equipment 400, and the processing system 200.

Figure 8:
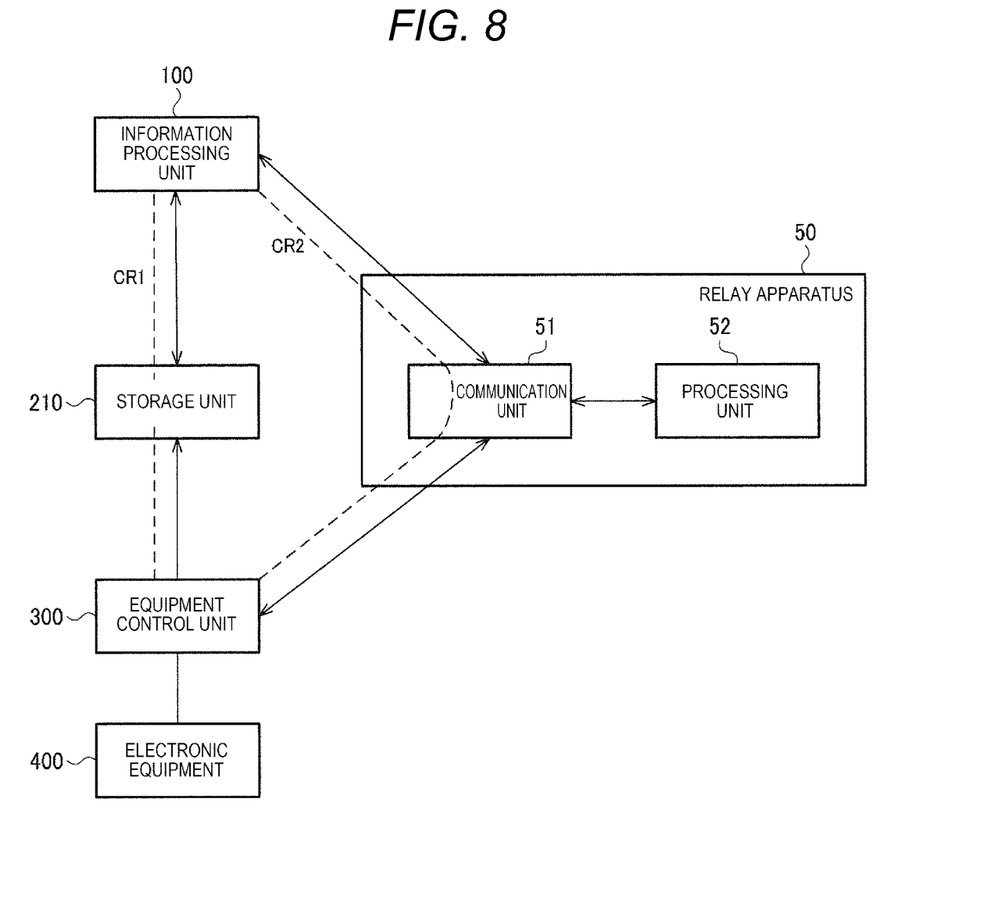
FIG. 8 is a diagram illustrating an example of a configuration of a relay apparatus.

As illustrated in FIG. 8, the technique according to the present embodiment can be applied to a relay apparatus 50 that includes a communication unit 51 and a processing unit 52. The communication unit 51 performs communication between the equipment control unit 300 that collects the information on the electronic equipment 400 which is the target for control, and the information processing unit 100 that performs processing which is based on the information that is stored in the storage unit 210 in which the information from the equipment control unit 300 is stored. The processing unit 52 controls the communication unit 51. The communication unit 51, for example, is a communication interface, and the processing unit 52, for example, is a processor.

The communication unit 51 of the relay apparatus 50 receives the control command of the electronic equipment 400 from the information processing unit 100. Then, the communication unit 51 performs the relay of the control command between the information processing unit 100 and the equipment control unit 300 along the second communication path CR2 that is different from the first communication path CR1 that is the communication path between the information processing unit 100 and the equipment control unit 300 with the storage unit 210 in between.

The relay apparatus 50, for example, corresponds to the command server 22. As described above, the relay apparatus 50 may be the message broker that complies with the MQTT, may be the Web server that supports the Web Socket, may be the chat server, and may be the mail server.

It is noted that the processing unit 52 according to the present embodiment is configured with hardware that will be described below. The hardware can include at least one of a circuit that processes a digital signal and a circuit that processes an analog signal. For example, the hardware is configured with one or multiple circuit devices that are mounted on a circuit substrate, or with one or multiple circuit elements. One or multiple circuit devices, for example, are an IC or the like. One or multiple circuit elements, for example, is a capacitor or the like.

Furthermore, the processing unit 52 may be realized by a processor that will be described below. The relay apparatus 50 according to the present embodiment includes a memory in which information is stored, and a processor that operates based on the information stored in the memory. Example of the information includes a program, various pieces of data, and the like. The processor includes hardware. It is possible that regarding the processing, various processors are used such as a central processing unit (CPU), a graphic processing unit (GPU), and a digital signal processor (DSP). The memory, for example, may be a semiconductor memory, such as a static random access memory (SRAM) or a dynamic random access memory (DRAM), may be a register, may be a magnetic storage device, such as a hard disk device, and may be an optical storage device, such as an optical disk device. For example, a computer-readable instruction is stored in the memory, and the instruction is executed by the processor. Thus, a function of each of the units of the relay apparatus 50 is realized as processing. The instruction here may be a command in an instruction set that makes up the program, and may be an instruction that instructs a hardware circuit of the processor to perform an operation.

As described above, a processing system according to the present embodiment is a processing system that is provided outside of a network in which an equipment control unit that controls electronic equipment which is a target for control is included, and includes a storage unit that receives information on the electronic equipment from the equipment control unit and stores the received information on the electronic equipment, and a command relay unit. The command relay unit receives a control command for causing the equipment control unit to perform control of the electronic equipment, from an information processing unit that performs processing which is based on the information that is stored in the storage unit. The command relay unit transmits the control command along the second communication path that is different from a first communication path that is a communication path between the information processing unit and the equipment control unit, and thus performs relay of the control command between the information processing unit and the equipment control unit.

According to the present embodiment, the command relay unit is provided in the system in which the information that is collected by the equipment control unit, which is stored in the storage unit, is processed in the information processing unit, and thus a new communication path is provided between the information processing unit and the equipment control unit. Accordingly, it is possible that the control command from the information processing unit is suitably transmitted to the equipment control unit.

Furthermore, according to the present embodiment, the command relay unit may perform processing that accumulates the control command received from the information processing unit. In a case where it is determined that the electronic equipment that is a target for the control command is in a state of being able to execute the control command, the command relay unit may perform processing that transmits the control command to the equipment control unit.

When this is done, it is possible that the transmission of the control command that results from considering the state of the electronic equipment is possible. For example, it is possible to suppress the electronic equipment from being blocked from operating due to the transmission of the control command.

Furthermore, according to the present embodiment, the command relay unit may perform the notification processing that notifies that the control command is received.

When this is done, the reception of the control command is triggered, and thus it is possible that suitable processing for controlling the electronic equipment is started.

Furthermore, according to the present embodiment, access to the equipment control unit from the information processing unit along the first communication path is limited in the firewall, and the access to the equipment control unit from the information processing unit along the second communication path may not be restricted in the firewall.

When this is done, unsuitable access to the equipment control unit in normal communication can be not only suppressed, but it is also possible that the control command is suitably transmitted to the equipment control unit.

Furthermore, according to the present embodiment, the second communication path may be the communication path for the chat server.

When this is done, the command relay unit can be realized by the chat server. Because it is possible that an existing configuration is utilized, the processing system is easy to realize.

Furthermore, according to the present embodiment, the second communication path may be the communication path for the mail server.

When this is done, the command relay unit can be realized by the mail server. Because it is possible that an existing configuration is utilized, the processing system is easy to realize.

Furthermore, according to the present embodiment, the second communication path may a communication path along which the communication in accordance with the MQTT or the Web Socket is performed.

When this is done, the communication scheme can be realized using a suitable communication scheme.

Furthermore, according to the present embodiment, the control command may be the command for setting the electronic apparatus.

When this is done, it is possible that the setting of the electronic equipment is performed from the information processing unit. For example, it is possible that the setting of the electronic component is performed from the remote information processing unit.

Furthermore, according to the present embodiment, the control command is the information collection command that collects the information on the electronic equipment, and the storage unit stores the information collected by the equipment control unit based on the information collection command and transmits the stored information to the information processing unit. Thus, relay of information between the equipment control unit and the information processing unit along the first communication path may be performed.

When this is done, it is possible that the information on the electronic equipment is acquired with the information processing unit as the source. For example, it is possible that specific information is acquired at an arbitrary timing. On this occasion, by changing the communication path using the information collection system and the collected information, efficient relay of information is possible.

Furthermore, the present embodiment relates to a control system that includes the physical system described above and electronic equipment.

Furthermore, a relay apparatus according to the present embodiment includes a communication unit that performs communication between an equipment control unit that controls the electronic equipment which is a target for control, and an information processing unit that performs processing which is based on information that is stored in a storage unit that receives information on the electronic equipment from the equipment control unit and stores the received information on the electronic equipment, and a processing unit that controls the communication unit. The storage unit is provided outside of a network in which the equipment control unit is included. The communication unit receives a control command for causing the equipment control unit to perform control of the electronic equipment from the information processing unit, transmits the control command along a second communication path that is different from a first communication path which is a communication path between the information processing unit and the equipment control unit with the storage unit in between, and thus performs relay of the control command between the information processing unit and the equipment control unit.

Furthermore, a communication method according to the present embodiment, which is a communication method in a processing system that is provided outside of a network in which an equipment control unit that controls electronic equipment which is a target for control is included, includes receiving information on the electronic equipment from the equipment control unit, and transmitting information to an information processing unit that performs processing which is based on information, along a first communication path, with a storage unit storing the received information on the electronic equipment in between. Furthermore, the communication method receives the control command for causing the equipment control unit to control the electronic equipment, from the information processing unit, transmits the control command along a second communication path that is different from the first communication path, and thus performs relay of the control command between the information processing unit and the equipment control unit.

It is noted that the present embodiment is described in detail above, but that a person of ordinary skill in the art can easily understand that many modifications are possible which do not substantially depart from new matters or effects according to the present disclosure. Therefore, such modification examples are all included within the scope of the present disclosure. For example, the term that is described at least one time together with a different term that has a broader meaning or the same meaning, in the specification or the drawings, can be replaced with the different term, at any place in the specification or the drawings. Furthermore, combination of the present embodiment and all modification examples are also included in the scope of the present disclosure. Furthermore, configurations of, and operations by, the processing system, the database server, the command server, the management apparatus, and the like are not limited those which are described according to the present embodiment, and various modification implementations are possible.

What is claimed is:

1. A processing system that is provided outside of a local network in which an equipment control apparatus and an electronic equipment reside, wherein the equipment control apparatus controls the electronic equipment, the processing system comprising:
a storage apparatus that
receives information on the electronic equipment from the equipment control apparatus along a first communication path that extends outside the local network and is via the storage apparatus,
stores the received information on the electronic equipment,
transmits the information to an information processing apparatus that performs processing based on the transmitted information; and
a command relay apparatus that
receives a control command from the information processing apparatus along a second communication path that extends outside the local network and is not via the storage apparatus,
transmits the control command to the equipment control apparatus along the second communication path, causing the equipment control apparatus to transmit the control command to the electronic equipment, and
thus performs relay of the control command between the information processing apparatus and the equipment control apparatus,
wherein the command relay apparatus performs notification processing that notifies that the control command is received.

2. The processing system according to claim 1, wherein the command relay apparatus performs processing that accumulates the control command received from the information processing apparatus, and, when it is determined that the electronic equipment that is a target for the control command is in a state of being able to execute the control command, performs processing that transmits the control command to the equipment control apparatus.

3. The processing system according to claim 1, wherein access to the equipment control apparatus from the information processing apparatus along the first communication path is restricted in a firewall, and access to the equipment control apparatus from the information processing apparatus along the second communication path is not restricted in the firewall.

4. The processing system according to claim 1, wherein the second communication path is a communication path for a chat server.

5. The processing system according to claim 1, wherein the second communication path is a communication path along which communication in accordance with Message Queuing Telemetry Transport (MQTT) or a Web Socket is performed.

6. The processing system according to claim 1, wherein the control command is a command for setting the electronic equipment.

7. The processing system according to claim 1, wherein the control command is an information collection command that collects the information on the electronic equipment, and the storage apparatus stores the information collected by the equipment control apparatus based on the information collection command, transmits the stored information to the information processing apparatus, and thus performs relay of the information between the equipment control apparatus and the information processing apparatus along the first communication path.

8. A control system comprising:
the processing system according to claim 1; and
the electronic equipment.

9. A processing system that is provided outside of a local network in which an equipment control apparatus and an electronic equipment reside, wherein the equipment control apparatus controls the electronic equipment, the processing system comprising:
a storage apparatus that
receives information on the electronic equipment from the equipment control apparatus along a first communication path that extends outside the local network and is via the storage apparatus,
stores the received information on the electronic equipment,
transmits the information to an information processing apparatus that performs processing based on the transmitted information; and
a command relay apparatus that
receives a control command from the information processing apparatus along a second communication path that extends outside the local network and is not via the storage apparatus,
transmits the control command to the equipment control apparatus along the second communication path, causing the equipment control apparatus to transmit the control command to the electronic equipment, and
thus performs relay of the control command between the information processing apparatus and the equipment control apparatus,
wherein the second communication path is a communication path for a mail server.

10. A relay apparatus provided outside of a local network comprising:
a communication apparatus that performs communication between an equipment control apparatus and an information processing apparatus,
wherein:
the equipment control apparatus controls an electronic equipment,
both the equipment control apparatus and the electronic equipment reside in the local network,
the information processing apparatus performs processing based on information stored in a storage apparatus,
the storage apparatus
receives information on the electronic equipment from the equipment control apparatus along a first communication path that extends outside the local network and is via the storage apparatus,
stores the received information on the electronic equipment,
transmits the information to the information processing apparatus that performs processing based on the transmitted information; and
a processing apparatus that controls the communication apparatus, wherein the storage apparatus is provided outside of the local network in which the equipment control apparatus is included,
wherein the communication apparatus
receives a control command from the information processing apparatus along a second communication path that extends outside the local network and is not via the storage apparatus,
transmits the control command to the equipment control apparatus along the second communication path, causing the equipment control apparatus to transmit the control command to the electronic equipment,
thus performing relay of the control command between the information processing apparatus and
the equipment control apparatus, and <NL> performs notification processing that notifies that the control command is received.

11. A communication method in a processing system that is provided outside of a local network in which an equipment control apparatus and an electronic equipment are included, wherein the equipment control apparatus controls the electronic equipment, the communication method comprising:
receiving information on the electronic equipment from the equipment control apparatus along a first communication path that extends outside the local network and is via a storage apparatus;
transmitting the information to an information processing apparatus that is outside the local network and performs processing based on the transmitted information;
receiving a control command for causing the equipment control apparatus to control the electronic equipment, from the information processing apparatus along a second communication path that extends outside the local network and is not via the storage apparatus;
transmitting the control command to the equipment control apparatus along the second communication path that, causing the equipment control apparatus to transmit the control command to the electronic equipment; and
thus performing relay of the control command between the information processing apparatus and
the equipment control apparatus, and <NL> performs notification processing that notifies that the control command is received.

* * * * *